United States Patent
Matiash et al.

(10) Patent No.: US 6,720,528 B1
(45) Date of Patent: Apr. 13, 2004

(54) HEAD TUBE ASSEMBLY HAVING INSULATED MECHANICAL INTERFACE WITH WELDING GUN BODY

(75) Inventors: Nicholas A. Matiash, Oshkosh, WI (US); Kenneth C. Altekruse, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 10/272,210

(22) Filed: Oct. 16, 2002

(51) Int. Cl.[7] .............................................. B23K 9/173
(52) U.S. Cl. .............................. 219/137.31; 219/137.63
(58) Field of Search .................... 219/137.1, 137.31, 219/137.63, 137.41, 137.42, 137.43, 137.44

(56) References Cited

U.S. PATENT DOCUMENTS

| | | | | |
|---|---|---|---|---|
| 3,529,128 A | * | 9/1970 | Cruz, Jr. ................ | 219/137.44 |
| 3,775,584 A | * | 11/1973 | Moerke ................... | 219/137.63 |
| 4,549,068 A | * | 10/1985 | Kensrue .................. | 219/137.63 |
| 5,595,671 A | * | 1/1997 | David ..................... | 219/137.62 |
| 5,611,951 A | * | 3/1997 | Kunz et al. ............ | 219/137.62 |
| 5,866,874 A | * | 2/1999 | Haczynski et al. .... | 219/137.31 |
| 6,025,574 A | | 2/2000 | Colangelo, Jr. ........ | 219/137.31 |
| 6,225,599 B1 | | 5/2001 | Altekruse .............. | 219/137.31 |
| 6,444,950 B1 | | 9/2002 | Altekruse et al. ...... | 219/137.42 |
| 2002/0113046 A1 | | 8/2002 | Altekruse et al. ...... | 219/137.42 |
| 2002/0113047 A1 | | 8/2002 | Doherty ................. | 219/137.42 |

FOREIGN PATENT DOCUMENTS

GB    2 274 081 A   *   7/1994

* cited by examiner

*Primary Examiner*—Kiley Stoner
*Assistant Examiner*—Len Tran
(74) *Attorney, Agent, or Firm*—Ostrager Chong & Flaherty LLP

(57) ABSTRACT

A welding gun comprising: an electrically conductive gun body having a passageway; a head tube assembly having one end inserted in the passageway of the gun body; a rotation nut that retains the head tube assembly in the inserted state when the rotation nut is threadably coupled to the gun body; and an electrically insulative ring installed between a portion of the gun body and an electrically conductive part of the head tube assembly. The electrically conductive gun body has a frusto-conical inner peripheral surface that is in contact with a frusto-conical outer peripheral surface of the electrically insulative ring. The rotation nut comprises an electrically conductive part that is threadably engaged to the electrically conductive gun body and that is in electrical contact with the electrically conductive portion of the head tube assembly. Electric current for welding is transmitted around the electrically insulative ring, through the electrically conductive portion of the rotation nut and into the electrically conductive part of the head tube assembly.

35 Claims, 5 Drawing Sheets

HEAD TUBE ASSEMBLY HAVING INSULATED MECHANICAL INTERFACE WITH WELDING GUN BODY

BACKGROUND OF THE INVENTION

This invention generally relates to gas metal arc welding (GMAW) and flux core arc welding (FCAW). In particular, the invention relates to wire feeding guns.

Wire feeding guns must perform several different functions in order for successful welding to occur. Those functions include directing the weld wire to the workpiece, conducting electric power to the weld wire, and shielding the welding arc from atmospheric air. In addition to the foregoing basic requirements, it is highly desirable that the weld wire be fed to the workpiece at an adjustable rate that suits the particular welding operation at hand. For maximum productivity, it is also necessary that the gun be very comfortable for the operator to maneuver as he directs the weld wire to the workpiece.

To satisfy the foregoing requirements, the wire feeding gun is connected by a long flexible cable to a wire feeder, which is wired to a welding machine. The wire feeder supplies the weld wire, electric power, cooling fluid, and shielding gas through the cable to the gun. In some instances, the cable may be as long as 50 feet.

In a typical wire feeding gun arrangement, there is a head tube on the end of the handle opposite the flexible cable. A diffuser is joined to the free end of the head tube. A contact tip is connected to the diffuser. The weld wire is guided by a liner, placed inside the head tube, that extends from the handle to the diffuser. From the diffuser, the weld wire passes through the contact tip, from which it emerges under the impetus of the feed mechanism.

In gas-shielded applications, it is vital that the gas adequately shield the welding arc from the ambient atmosphere. For that purpose, gas is supplied to the wire feeding gun from the wire feeder through the flexible cable. The gas is directed through the head tube to the interior of the diffuser. The gas flows from the diffuser to a nozzle that surrounds the contact tip. The gas then flows out the nozzle and surrounds the contact tip and the weld wire emerging from the contact tip. The gas thus shields the weld wire and the welding arc from the ambient atmosphere.

In known MIG welding guns of the type disclosed in U.S. Pat. No. 6,225,599, the nozzle assembly is insulated by a tubular insulator from an electrically hot conductor that conducts welding power from the gun handle to the diffuser. Accordingly, the diffuser is electrically hot. Another insulator is supported by the diffuser to separate the electrically hot conductor and diffuser from the electrically cold head tube exterior, locking nut, and nozzle. The contact tip can be connected to the diffuser by a nut, in which case, both the contact tip and nut are electrically hot. The contact tip transmits the welding electrical power from the diffuser and the conductor to the weld wire. The contact tip may be screwed into the diffuser.

In a known MIG welding gun, the welding electrical power is transmitted from the gun body to a brass fitting, which in turn transmits the welding electrical power to the aforementioned conductor. That brass fitting was designed with a frusto-conical surface that seats inside and against a frusto-conical surface formed in the distal end of the gun body. These engaging frusto-conical surfaces provide a self-centering of the brass fitting relative to the distal end of the gun body. The brass fitting is captured between a rotation nut and the distal end of the gun body, the latter having a threaded outer periphery that is threadably engaged by a threaded bore inside the rotation nut. The known rotation nut comprises a threaded brass nut encased in a shroud of molded nylon.

In this known MIG gun arrangement, current is carried from the gun body to the brass fitting across the aforementioned frusto-conical interface. This caused problems because the fit between the two frusto-conical surfaces was not always tight due to manufacturing tolerances and the current passing between them caused pitting and corrosion. Once pitting and corrosion started, the fit would deteriorate further, giving rise to a compounding problem. Furthermore, the brass fitting and gun body distal portion also had a non-frusto-conical interface where water was present, which could sometimes compound the problem if the head tube were mishandled. Corrosion at the frusto-conical interface could ultimately cause binding of the head tube assembly to the gun body.

There is a need for an improved mechanical interface between the head tube assembly and the welding gun body that will not be afflicted by pitting and corrosion, and that will not cause the binding of the head tube to the gun body.

BRIEF DESCRIPTION OF THE INVENTION

The invention is directed to a welding gun in which a mechanical interface between the gun body and the head tube assembly is electrically insulated, and electric current is transferred through a rotation nut or other fastener that holds the head tube assembly and the gun body together.

One aspect of the invention is a welding gun comprising an electrically conductive gun body and a head tube assembly supported by the gun body, the head tube assembly comprising: an electrically conductive fitting comprising an end that is engaged with the gun body; an electrically conductive tube comprising an end in contact with the fitting; a retaining device comprising an electrically conductive portion that is in contact with and coupled to the gun body and in contact with the fitting, the retaining device retaining the fitting in engagement with the gun body when the retaining device is coupled to the gun body; and an electrical insulator disposed between and in contact with respective portions of the fitting and the gun body.

Another aspect of the invention is a welding gun comprising an electrically conductive gun body and a head tube assembly supported by the gun body, the gun body comprising a threaded outer peripheral surface and a cavity defined in part by a frusto-conical inner peripheral surface, and the head tube assembly comprising: an electrically conductive fitting comprising an end that is received in the cavity of the gun body; an electrically conductive tube comprising an end supported by the fitting; a rotation nut comprising an electrically conductive portion that is in contact with the gun body and the fitting, the electrically conductive portion comprising a threaded inner peripheral surface that threadably engages the threaded outer peripheral surface of the gun body; and an electrical insulator disposed between and in contact with the fitting and the frusto-conical inner peripheral surface of the gun body. The rotation nut fastens the fitting to the gun body when the rotation nut is threadably engaged with the gun body.

A further aspect of the invention is a welding gun comprising: an electrically conductive gun body comprising a passageway, the passageway comprising a circular cylindrical inner peripheral surface and a frusto-conical inner peripheral surface; an electrically conductive fitting comprising a passageway, a collar and a circular cylindrical outer peripheral surface located inside the circular cylindrical inner peripheral surface of the gun body; an electrically conductive tube having one end supported in the passageway of the fitting and projecting forward of the fitting; an electrically insulative ring comprising a frusto-conical outer peripheral surface in contact with the frusto-conical inner peripheral surface of the gun body and a circular cylindrical inner peripheral surface in contact with the circular cylindrical outer peripheral surface of the fitting; and a retaining device comprising an electrically conductive portion that is in contact with and coupled to the gun body and in contact with the fitting. The retaining device retains the fitting in engagement with the gun body when the retaining device is coupled to the gun body.

Yet another aspect of the invention is a welding gun comprising: an electrically conductive gun body comprising a passageway; an assembly comprising a sequence of electrically conductive components connected in series to form a conductive path for electric current and a passageway for welding wire, one that retains the assembly in the inserted state when the rotation nut is threadably coupled to the gun body; and an electrically insulative ring installed between an electrically conductive portion of the gun body and an electrically conductive portion of the assembly. The ring comprises a frusto-conical outer peripheral surface.

A further aspect of the invention is a method of assembling a welding gun, comprising the following steps: sliding a ring of electrically insulative material onto an end portion of a head tube assembly until the ring is proximal to a first portion of the end portion of the head tube assembly having a maximum dimension greater than an inner diameter of the ring, the ring having a frusto-conical outer peripheral surface; inserting a second portion of the end portion of the head tube assembly into a cavity of a gun body until the frusto-conical outer peripheral surface of the electrically insulative ring engages a frusto-conical inner peripheral surface of the gun body cavity; and fastening the head tube assembly to the gun body Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION OF THE INVENTION

Figure 1:
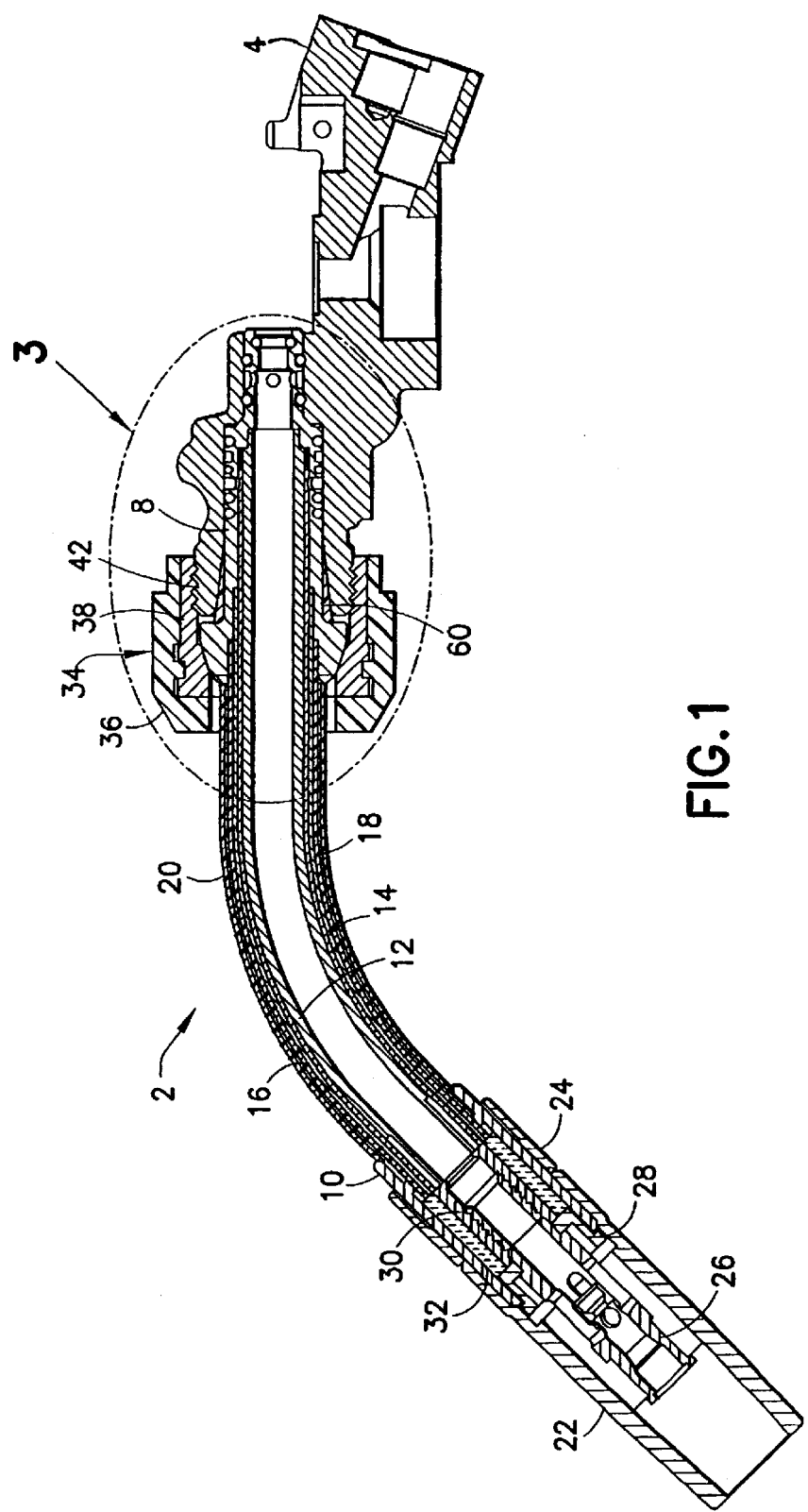
FIG. 1 is a drawing showing a sectional view of a head tube assembly fastened to a welding gun body in accordance with one embodiment of the present invention.
Figure 2:
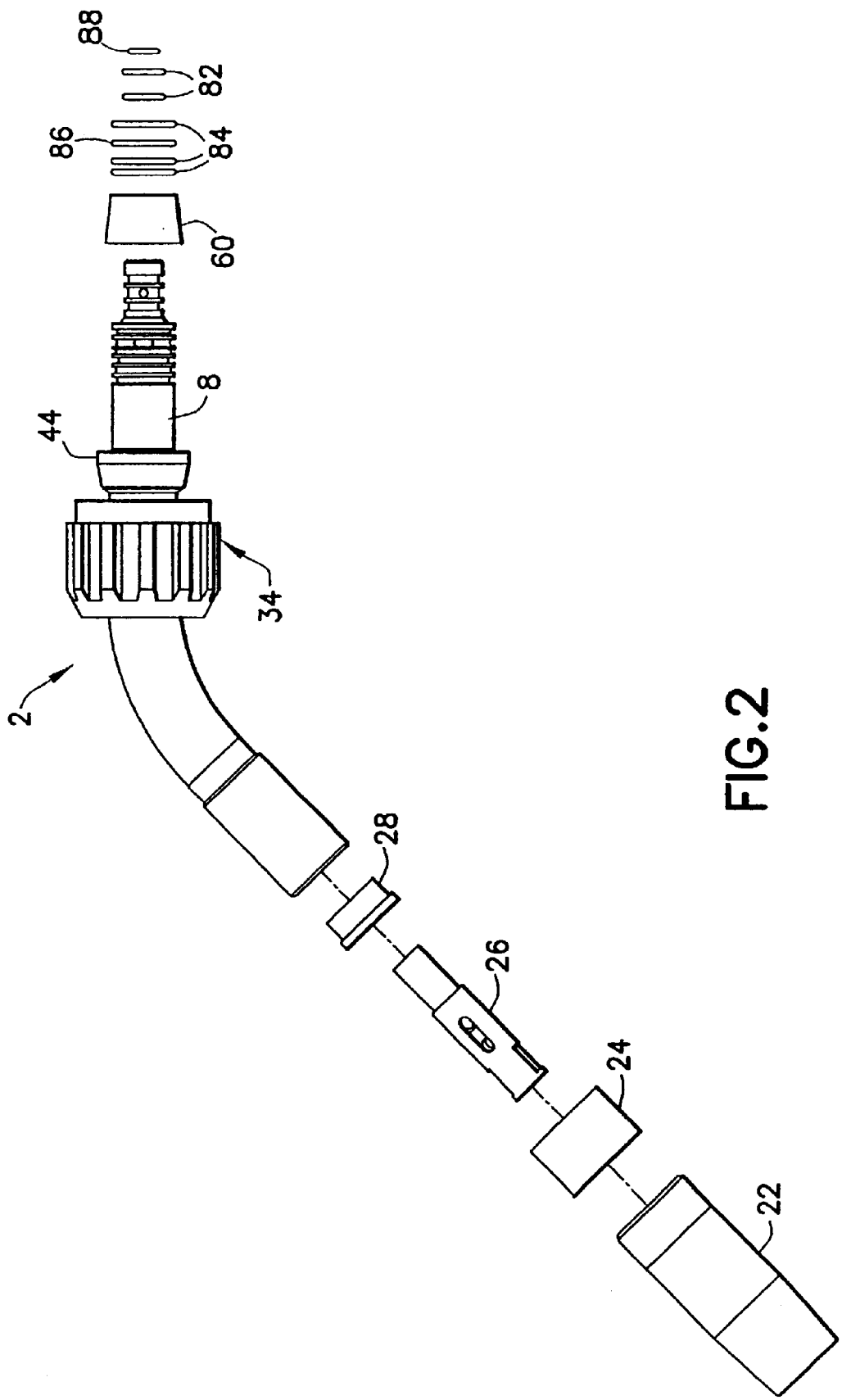
FIG. 2 is a drawing showing an exploded view of the head tube assembly depicted in FIG. 1.
Figure 3:
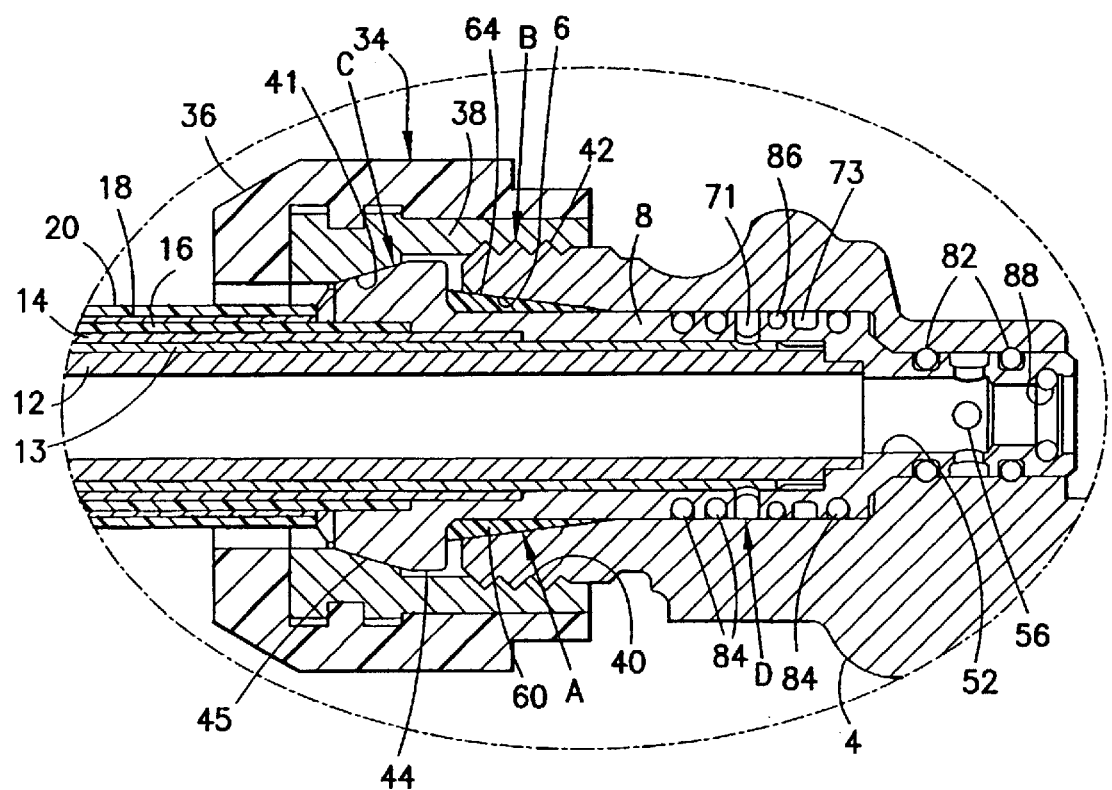
FIG. 3 is a drawing showing a magnified sectional view of the mechanical interface between the head tube assembly and the welding gun body depicted in FIG. 1.

A welding gun in accordance with one embodiment of the invention is shown in FIGS. 1–3. Referring to FIG. 1, the welding gun comprises a head tube assembly 2 mechanically and electrically coupled to an electrically conductive welding gun body 4. The welding gun body 4 has a threaded outer peripheral surface and a cavity defined in part by a frusto-conical inner peripheral surface 6. The head tube assembly 2 comprises respective fittings 8 and 10 brazed to the opposing ends of a tubular structure consisting of an inner copper tube 12, an outer copper sleeve 13, a steel tube 14 surrounding copper sleeve 13, a Teflon casing 16 encasing steel tube 14, a steel tube 18 surrounding Teflon casing 16, and an outer Teflon casing 20 encasing steel tube 18. The end of the copper tube 12 is inserted in and brazed to brass fitting 8. Middle and end sections of the fitting 8, having different diameters, fit inside respective sections of the aforementioned cavity of the gun body 4. Thus, the head tube assembly 2 is supported at one end by the gun body 4.

At the other end of the head tube assembly, a head tube outer jacket fitting 10 is brazed to the distal end of steel tube 18 and in turn supports the nozzle 22. The nozzle 22 is fastened in place by a nozzle adapter locking nut 24. A diffuser 26, disposed inside the nozzle, is threaded into copper piece 30, which is brazed to the end of the copper tube 12. Copper piece 30 is surrounded by a ceramic insulator ring 32. Item 28 in FIG. 1 is a diffuser insulator. The copper tube 12 conducts electric current from the fitting 8 to the diffuser 26, which in turn transmits the electric current to the contact tip. Accordingly, the diffuser 26 is electrically hot. The ceramic insulator 32 is supported by the copper piece 30 to separate the electrically hot copper tube 12 and diffuser 26 from the electrically cold steel tube 18, fitting 10, and nozzle 22. The contact tip (not shown) transmits the electrical current from the diffuser 26 to the welding wire (not shown). The welding wire is fed to a bore in the diffuser 26 via a liner (not shown) that lies inside the copper tube 12.

Figure 5:
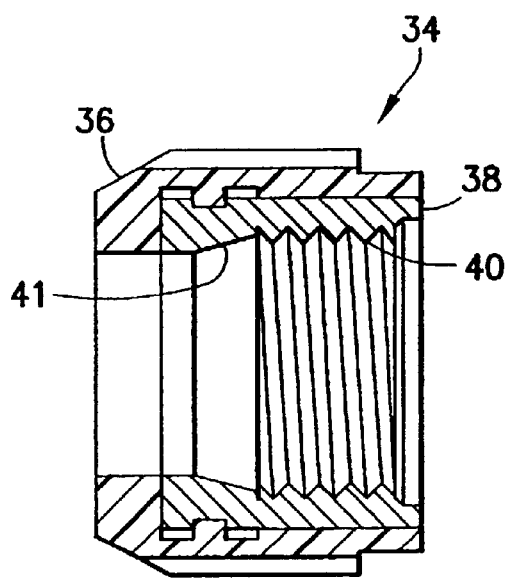
FIG. 5 is a drawing showing a sectional view of a rotation nut incorporated in the head tube assembly depicted in FIGS. 1–3.

Referring to FIG. 3, the fitting 8 is coupled to the gun body 4 by means of a molded rotation nut 34. As best seen in FIG. 5, the rotation nut 34 comprises a threaded brass nut 38 encased in molded nylon 36. In the assembly view of FIG. 3, the brass nut 38 is in contact with the gun body 4 and the fitting 8. As will be explained in more detail below, electric current is transmitted from the gun body 4 to the fitting 8 via the brass nut 38. The brass nut 38 has a threaded inner peripheral surface 40 that threadably engages a threaded outer peripheral surface 42 of the gun body 4. The rotation nut 34 retains the fitting 8 in a coupled state with the gun body 4 when the rotation nut 34 is fully threadably engaged with the gun body 4.

In accordance with a known welding gun having a fitting for electrically coupling the head tube assembly to the gun body, the fitting has a frusto-conical outer peripheral surface in contact with a frusto-conical inner peripheral surface of the gun body similar to surface 6 shown in FIG. 3. As explained in the Background of the Invention section, such an arrangement has been known to give rise to pitting and corrosion due to arcing. In accordance with one embodiment of the invention, this problem is solved by redesigning the fitting to eliminate the frusto-conical outer peripheral surface and substitute a tapered electrically insulative insert 60 having an outer peripheral surface with the same frusto-conical geometry. As best seen in FIG. 3, the electrical insulator 60 is disposed between and in contact with a circular cylindrical outer peripheral surface 48 of the fitting 8 and the frusto-conical inner peripheral surface 6 of the gun body 4. The insulator 60 may be made of Delrin. The electrical insulator 60 acts as a shield to prevent current from being transmitted directly from the frusto-conical inner peripheral surface 6 of the gun body 4 to the fitting 8.

Figure 6:
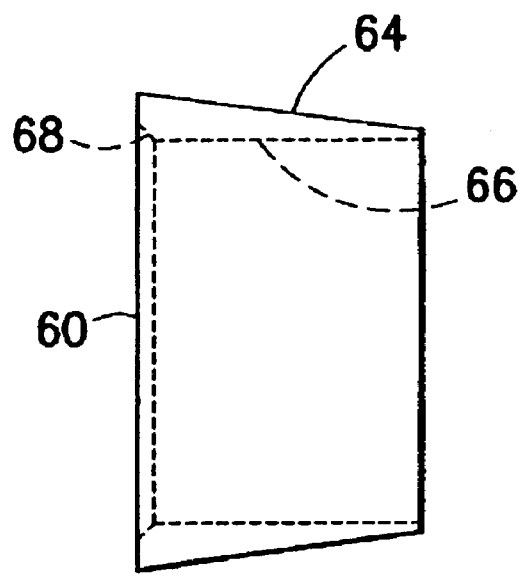
FIGS. 6 and 7 are drawings showing side and isometric views respectively of an electrical insulator incorporated in the head tube assembly depicted in FIGS. 1–3.
Figure 7:
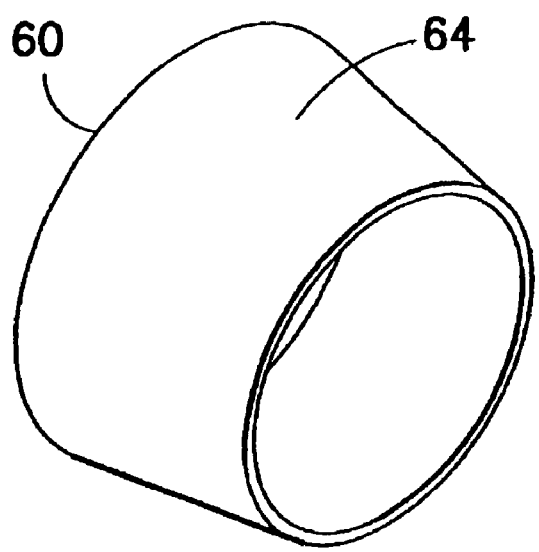

The electrical insulator 60 is shown in more detail in FIGS. 6 and 7. The insulator 60 is ring-shaped and comprises a frusto-conical outer peripheral surface 64 that will be located inside and in contact with the frusto-conical inner peripheral surface 6 of the gun body. The insulator 60 further comprises a circular cylindrical inner peripheral surface 66 surrounding and in contact with the outer peripheral surface 48 of the fitting 8. The insulator 60 has a chamfer 68 at the end of the inner peripheral surface 66 where the insulator thickness (measured in a radial direction) is greatest. The chamfer facilitates insertion of the insulator onto the fitting. The opposing frusto-conical surfaces 6 and 64 have the same slope, so that the interaction of these mating surfaces during insertion of the insulator 60 into the cavity of the gun body 4 causes self-centering of the insulator (and consequently, centering of the fitting) relative to the gun body cavity.

Figure 4:
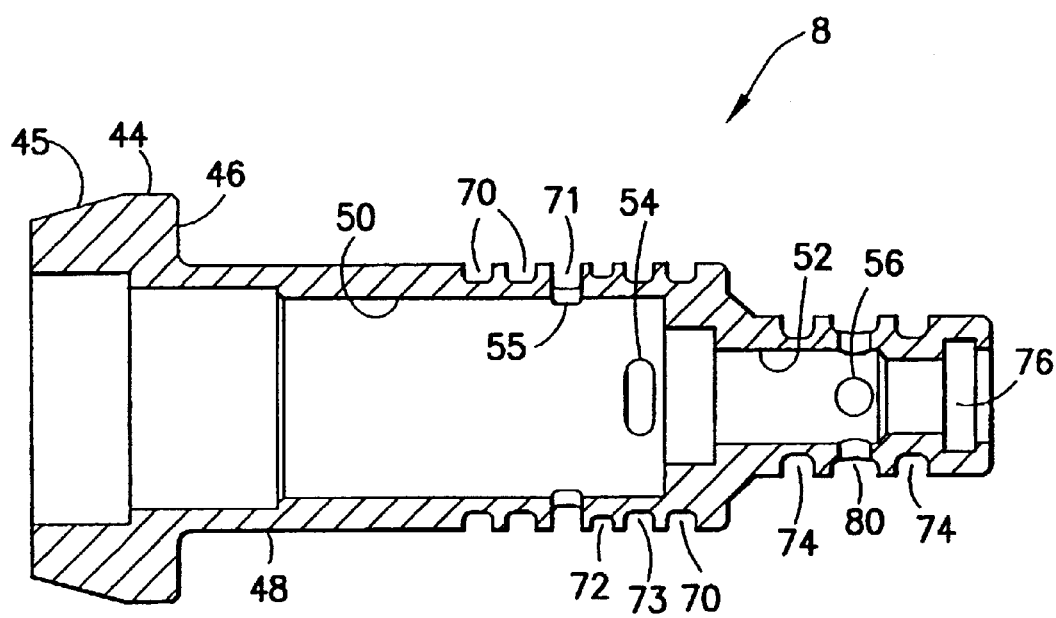
FIG. 4 is a drawing showing a sectional view of an electrically conductive fitting incorporated in the head tube assembly depicted in FIGS. 1–3.

Referring now to FIG. 4, the brass fitting 8 that couples the head tube assembly to the gun body is a machined part comprising a generally circular cylindrical middle section having a first outer diameter, a collar 44 on one side of the middle section, and a generally circular cylindrical end section having a second diameter on the other side of the middle section, the second diameter being smaller than the first diameter. The gun body has respective bore sections sized to receive the circular cylindrical middle and end sections of the fitting. As best seen in FIG. 3, respective surfaces on the fitting 8 and the gun body 4 define a volume occupied by the electrical insulator 60. A side wall 46 of the collar 44 of the fitting abuts a proximal end face of the insulator 60; the inner peripheral surface 66 (see FIG. 6) of the insulator 60 sits on the circular cylindrical outer peripheral surface 48 of the middle section of the fitting; and the frusto-conical outer peripheral surface 64 of the insulator 60 bears against the frusto-conical inner peripheral surface 6 of the gun body 4, as previously described.

The collar 44 of the fitting further comprises a frusto-conical outer peripheral surface 45 (see FIG. 4) that engages a frusto-conical inner peripheral surface 41 (see FIG. 5) of the brass nut 38 during tightening of the molded nut 34 onto the threaded end 42 (see FIG. 3) of the gun body 4. The frusto-conical surface 6 of the gun body has an inner diameter that increases toward the rotation nut 34, whereas the frusto-conical surface 41 has an inner diameter that increases toward the gun body. Thus, when the nut is tightened onto the gun body, these tapered surfaces 6 and 41 hold the fitting 8 and electrical insulator 60 in the positions seen in FIG. 3.

Referring again to FIG. 4, the fitting 8 has a passageway comprising a circular cylindrical first bore section 50 of a first diameter and a circular cylindrical second bore section 52 of a second diameter less than the first diameter. As seen in FIG. 3, the ends of tube 12 and sleeve 13 fit inside the bore section 50, but cannot be inserted into bore section 52. A liner (not shown) that guides the welding wire to the diffuser will be inserted in the passageway formed by the tube 12 and bore section 52 of the fitting 8.

As best seen in FIG. 4, the bore section 52 of the fitting 8 is provided with a plurality of radial holes 56 spaced at equal angular intervals about the circumference, which holes allow communication between the bore section 52 inside the fitting and an annular groove 80 formed on the outer periphery of the fitting. The annular groove 80 in turn communicates with a channel in the gun body that supplies shielding gas. The gas flows from the holes 56 to the gas diffuser 26 along the outside of the liner (not shown) and inside the copper tube 12. As best seen in FIG. 3, a pair of O-ring seals 82 are seated in respective annular grooves 74 that flank the annular groove 80. Seals 82 press against the opposing inner peripheral surface of the gun body and effectively seal the inert gas channel formed by the annular groove 80 and the opposing inner peripheral surface of the gun body. The gap between the end section of the fitting and the liner (not shown) is sealed at one end by another O-ring seal 88, which is seated in an annular groove 76 (see FIG. 4) formed on the inner peripheral surface of the fitting end section and presses against the outer peripheral surface of the liner.

Referring again to FIG. 4, the middle section of the fitting 8 is provided with a first pair of slots 54 and a second pair of slots 55 displaced longitudinally relatively to the first pair of slots 54. These slots allow communication between the second bore section 50 and a respective pair of annular grooves 71 and 73 formed on the outer periphery of the fitting. One of annular grooves 71 and 73 communicates with a channel in the gun body that supplies cooling water, while the other annular groove communicates with a channel in the gun body that removes cooling water. The water enters via one pair of slots, travels toward the diffuser in channels between longitudinal lobes formed on the one side of the outer periphery of copper tube 12, encapsulated by copper sleeve 13, reverses direction in an annular groove at the end of the copper tube, travels back toward the fitting in channels between longitudinal lobes formed on the other side of the outer periphery of copper tube 12, and then exits via the other pair of slots.

As best seen in FIG. 3, an O-ring seal 86 is seated in an annular groove 72 that lies between the annular grooves 71 and 73. In addition, a trio of O-ring seals 84 are seated in respective annular grooves 70 that flank the annular grooves 71 and 73. Seals 84 and 86 press against the opposing inner peripheral surface of the gun body and effectively seal the cooling water channels formed by the annular grooves 71 and 73 and the opposing inner peripheral surface of the gun body.

The above-described mechanical interface design solves the problem of corrosion and binding between the head tube assembly and the gun body. The solution is accomplished by passing the welding current through the brass nut 38 that holds the head tube assembly in place, instead of through the tapered surface 6 in the gun body that locates the head tube assembly in a centered position. As a result, no arcing occurs across the mechanical interface between the head tube assembly 2 and the gun body 4.

Referring again to FIG. 3, the current path in the disclosed embodiment can be traced. In a prior art design, current was carried from the gun body 4 to the head tube assembly 2 through the area labeled as "A". This caused problems because the fit between the two frusto-conical surfaces in area "A" was not always tight and the current passing between them would cause pitting and corrosion. Furthermore, water (for cooling) is present in the area labeled "D" that could sometimes compound the problem if the head tube were mishandled. The tapered insulator 60 provides a nonconductive interface in area "A" on the head tube assembly 2. Consequently, the current (seeking a path of least resistance) is carried through the threaded area "B", through the brass nut 38 and then through the interface (of frusto-conical surfaces 41 and 45) in area "C" into the fitting 8. The surfaces 41 and 45 have a tight fit and do not give rise to the same problem. The taper of the frusto-conical inner peripheral surface 41 (see FIG. 5) of the nut 38 matches a taper of the frusto-conical outer peripheral surface 45 (see FIG. 4) of the fitting 8, providing enough surface contact for current conduction to occur.

Current could be conducted through area "D" because of the cooling water present there. However, due to the readily available current path through areas "B" and "C", most of the current will travel through areas "B" and "C" because it will take the path of least resistance. Furthermore, there is no chance that the current will arc across area "D" because of the path that is available through areas "B" and "C". Also, the fact that water is the connection between the two metal parts 4 and 8 means that these metal parts cannot bind or are together.

The specific materials cited above are disclosed for illustrative purposes only. It should be appreciated that the invention is not limited to the use of the specific materials disclosed herein. For example, the electrically insulative insert need not be made of Delrin, but instead could be made of other electrically insulative materials having sufficient rigidity, hardness and resistance to corrosion. Furthermore, the wire feeding gun may be an air-cooled system instead of a water-cooled system.

While the invention has been described with reference to preferred embodiments, it will be understood by those skilled in the art that various changes may be made and equivalents may be substituted for members thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

What is claimed is:

1. A welding gun comprising an electrically conductive gun body and a head tube assembly supported by said gun body and comprising:
    an electrically conductive fitting comprising an end that is engaged with said gun body;
    an electrically conductive tube comprising an end in contact with said fitting;
    a retaining device comprising an electrically conductive portion that is in electrical contact with and threadably coupled to said gun body and in electrical contact with said fitting, said retaining device retaining said fitting in engagement with said gun body when said retaining device is coupled to said gun body; and
    an electrical insulator disposed between and in contact with respective portions of said fitting and said gun body.

2. The welding gun as recited in claim 1, wherein said gun body comprises a frusto-conical inner peripheral surface, said insulator is ring-shaped and comprises a frusto-conical outer peripheral surface in contact with said frusto-conical inner peripheral surface of said gun body.

3. The welding gun as recited in claim 2, wherein said fitting comprises a circular cylindrical outer peripheral surface, and said insulator further comprises a circular cylindrical inner peripheral surface surrounding and in contact with said circular cylindrical outer peripheral surface of said fitting.

4. The welding gun as recited in claim 3, wherein said insulator further comprises a chamfer at one end of said circular cylindrical inner peripheral surface where a thickness of said insulator in a radial direction is greatest.

5. The welding gun as recited in claim 1, wherein said fitting comprises a collar, said insulator being disposed adjacent said collar.

6. The welding gun as recited in claim 1, wherein said gun body comprises a threaded portion, and said retaining device comprises a rotation nut that threadably engages said threaded portion of said gun body.

7. The welding gun as recited in claim 5, wherein said gun body comprises a first frusto-conical inner peripheral surface having an inner diameter that increases toward said retaining device, and said electrically conductive portion of said retaining device comprises a second frusto-conical inner peripheral surface having an inner diameter that increases toward said gun body.

8. The welding gun is recited in claim 7, wherein said insulator comprises a first frusto-conical outer peripheral surface in contact with said first frusto-conical inner peripheral surface, and said collar comprises a second frusto-conical outer peripheral surface in contact with said second frusto-conical inner peripheral surface.

9. The welding gun as recited in claim 1, wherein said retaining device further comprises an electrically insulative portion surrounding said electrically conductive portion.

10. The welding gun as recited in claim 1, wherein said head tube assembly further comprises an electrically insulative tube surrounding said electrically conductive tube.

11. The welding gun as recited in claim 1, wherein said electrically conductive tube is brazed to said fitting.

12. The welding gun as recited in claim 1, further comprising a diffuser having one end electrically coupled to said electrically conductive tube.

13. A welding gun comprising an electrically conductive gun body and a head tube assembly supported by said gun body, said gun body comprising a threaded outer peripheral surface and a cavity defined in part by a frusto-conical inner peripheral surface, and said head tube assembly comprising:
    an electrically conductive fitting comprising an end that is received in said cavity of said gun body;
    an electrically conductive tube comprising an end supported by said fitting;
    a rotation nut comprising an electrically conductive portion that is in contact with said gun body and said fitting, said electrically conductive portion comprising a threaded inner perlpheral surface that threadably engages said threaded outer peripheral surface of said gun body, said rotation nut fastening said fitting to said gun body when said rotation nut is threadably engaged with said gun body; and
    an electrical insulator disposed between and in contact with said fitting and said frusto-conical inner peripheral surface of said gun body.

14. The welding gun as recited in claim 13, wherein said insulator is ring-shaped and comprises a frusto-conical outer peripheral surface located inside and in contact with said frusto-conical inner peripheral surface of said gun-body.

15. The welding gun as recited in claim 14, wherein said fitting comprises a circular cylindrical outer peripheral surface, and said insulator further comprises a circular cylindrical inner peripheral surface surrounding and in contact with said circular cylindrical outer peripheral surface of said fitting.

16. The welding gun as recited in claim 15, wherein said insulator further comprises a chamfer at one end of said circular cylindrical inner peripheral surface where a thickness of said insulator in a radial direction is greatest.

17. The welding gun as recited in claim 13, wherein said fitting comprises a collar, said insulator being disposed adjacent said collar.

18. The welding gun as recited in claim 17, wherein said collar of said fitting comprises a frusto-conical outer peripheral surface, and said electrically conductive portion of said nut further comprises a frusto-conical inner peripheral surface in contact with said frusto-conical outer peripheral surface of said fitting.

19. The welding gun as recited in claim 13, wherein said rotation nut further comprises an electrically insulative portion surrounding said electrically conductive portion.

20. The welding gun as recited in claim 13, wherein said electrically conductive portion of said rotation nut and said fitting are made of brass.

21. The welding gun as recited in claim 13, wherein said insulator is made of Delrin or an electrically insulative material having similar rigidity, hardness and resistance to corrosion.

22. The welding gun as recited in claim 13, wherein said head tube assembly further comprises an electrically insulative tube surrounding said electrically conductive tube.

23. The welding gun as recited in claim 13, wherein said electrically conductive tube is brazed to said fitting.

24. The welding gun as recited in claim 13, further comprising a diffuser having one end electrically coupled to said electrically conductive tube.

25. A welding gun comprising:
an electrically conductive gun body comprising a passageway, said passageway comprising a circular cylindrical inner peripheral surface and a frusto-conical inner peripheral surface;
an electrically conductive fitting comprising a passageway, a collar and a circular cylindrical outer peripheral surface located inside said circular cylindrical inner peripheral surface of said gun body;
an electrically conductive tube having one end supported in said passageway of said fitting and projecting forward of said fitting;
an electrically insulative ring comprising a frusto-conical outer peripheral surface in contact with said frusto-conical inner peripheral surface of said gun body and a circular cylindrical inner peripheral surface in contact with said circular cylindrical outer peripheral surface of said fitting; and
a retaining device comprising an electrically conductive portion that is in contact with and coupled to said gun body and in contact with said fitting, said retaining device retaining said fitting in engagement with said gun body when said retaining device is coupled to said gun body.

26. The welding gun as recited in claim 25, wherein said electrically conductive portion of said retaining device comprises a frusto-conical inner peripheral surface and said collar comprises a frusto-conical outer peripheral surface in contact with said frusto-conical inner peripheral surface of said retaining device.

27. The welding gun as recited in claim 26, wherein said electrically conductive gun body, said electrically conductive portion of said retaining device, said electrically conductive fitting and said electrically conductive tube form a conductive path for electric current further comprising electrically insulative means surrounding said conductive path.

28. A welding gun comprising:
an electrically conductive gun body comprising a passageway;
an assembly comprising a sequence of electrically conductive components connected in series to form a conductive path for electric current and a passageway for welding wire, one end of said assembly being inserted in said passageway of said gun body;
a rotation nut that retains said assembly in said inserted state when said rotation nut is threadably coupled to said gun body; and
an electrically insulative ring installed between an electrically conductive portion of said gun body and an electrically conductive portion of said assembly, wherein said ring comprises a frusto-conical outer peripheral surface.

29. The welding gun as recited in claim 28, wherein said electrically conductive gun body comprises a frusto-conical inner peripheral surface that is in contact with said frusto-conical outer peripheral surface of said electrically insulative ring.

30. The welding gun as recited in claim 29, wherein said rotation nut comprises an electrically conductive frusto-conical inner peripheral surface and said comprises an electrically conductive frusto-conical outer peripheral surface in contact with said electrically conductive frusto-conical inner peripheral surface of said rotation nut.

31. A method of assembling a welding gun, comprising the following steps:
sliding a ring of electrically insulative material onto an end portion of a head tube assembly until said ring is proximal to a first portion of said end portion of said head tube assembly having a maximum dimension greater than an inner diameter of said ring, said ring having a frusto-conical outer peripheral surface;
inserting a second portion of said end portion of said head tube assembly into a cavity of a gun body until said frusto-conical outer peripheral surface of said electrically insulative ring engages a frusto-conical inner peripheral surface of said gun body cavity; and
fastening said head tube assembly to said gun body.

32. The method as recited in claim 31, wherein said fastening step comprises the steps of:
sliding a nut over said first portion of said end portion of said head tube assembly; and
tightening said nut onto a threaded portion of said gun body.

33. The method as recited in claim 32, further comprising the step of conducting electrical current through said gun body, said nut and said head tube assembly in series.

34. A welding gun comprising:
an electrically conductive gun body comprising a passageway;
an assembly comprising a sequence of electrically conductive components connected in series to form a conductive path for electric current and a passageway for welding wire, one end of said assembly being inserted in said passageway of said gun body, and a component of said assembly comprising an electrically conductive frusto-conical outer peripheral surface; and
an electrically conductive rotation nut that retains said assembly in said inserted state when said rotation nut is threadably coupled to said gun body, said rotation nut comprising an electrically conductive frusto-conical inner peripheral surface that engages said electrically conductive frusto-conical outer peripheral surface of said assembly component.

35. The welding gun as recited in claim 34, further comprising electrically insulative material encasing portions of said assembly and said rotation nut.

* * * * *